United States Patent
Wulbrecht et al.

(10) Patent No.: US 11,465,221 B2
(45) Date of Patent: Oct. 11, 2022

(54) HYBRID THREADING TOOL WITH CUTTING PORTION AND ROLLING PORTION

(71) Applicant: GM GLOBAL TECHNOLOGY OPERATIONS LLC, Detroit, MI (US)

(72) Inventors: David A. Wulbrecht, Clarkston, MI (US); Qigui Wang, Rochester Hills, MI (US); Tiruttani Munikamal, Bangalore (IN); Lokesh Choudhary, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/134,957

(22) Filed: Dec. 28, 2020

(65) Prior Publication Data

US 2022/0203469 A1   Jun. 30, 2022

(51) Int. Cl.
| | |
|---|---|
| *B23G 5/20* | (2006.01) |
| *B23G 5/06* | (2006.01) |
| *B23G 7/02* | (2006.01) |
| *B23G 5/04* | (2006.01) |
| *B23G 1/34* | (2006.01) |
| *B23G 1/50* | (2006.01) |

(52) U.S. Cl.
CPC .............. *B23G 5/20* (2013.01); *B23G 5/04* (2013.01); *B23G 5/06* (2013.01); *B23G 7/02* (2013.01); *B23G 1/34* (2013.01); *B23G 1/50* (2013.01); *B23G 2200/142* (2013.01); *B23G 2200/143* (2013.01); *B23G 2200/146* (2013.01)

(58) Field of Classification Search
CPC ... B23G 5/06; B23G 5/20; B23G 7/02; B23G 2200/142; B23G 2200/146; B23G 5/04
See application file for complete search history.

(56) References Cited

U.S. PATENT DOCUMENTS

| | | | |
|---|---|---|---|
| 2,300,310 A | 10/1942 | Poeton | |
| 2,816,302 A * | 12/1957 | Bauer | B23G 5/06 |
| | | | 470/84 |
| 3,251,080 A * | 5/1966 | Sharon | B23G 5/06 |
| | | | 470/84 |
| 4,271,554 A | 6/1981 | Grenell | |
| 6,931,901 B2 | 8/2005 | Ghiran et al. | |
| 7,150,588 B2 * | 12/2006 | Hakansson | B23G 7/02 |
| | | | 408/222 |
| 7,441,433 B2 | 10/2008 | Ghiran et al. | |

(Continued)

FOREIGN PATENT DOCUMENTS

| | | |
|---|---|---|
| DE | 1681887 U | 8/1954 |
| DE | 2244623 A | 3/1974 |

(Continued)

*Primary Examiner* — Eric A. Gates
(74) *Attorney, Agent, or Firm* — Lorenz & Kopf LLP

(57) ABSTRACT

A hybrid threading tool defines a longitudinal axis and includes a cutting portion with a plurality of cutting teeth. The plurality of cutting teeth are configured to cut a first threading into a workpiece. The hybrid threading tool also defines a forming portion that is attached to the cutting portion and that is arranged therewith along the longitudinal axis. The forming portion includes a plurality of forming teeth configured to plastically deform the first threading into a second threading for the workpiece.

20 Claims, 4 Drawing Sheets

(56) References Cited

U.S. PATENT DOCUMENTS

| | | | | |
|---|---|---|---|---|
| 7,552,610 | B2 * | 6/2009 | Fujiuchi | B23G 5/20 |
| | | | | 470/84 |
| 7,625,292 | B2 * | 12/2009 | Glimpel | B23G 5/06 |
| | | | | 408/222 |
| 8,220,301 | B2 * | 7/2012 | Ghiran | B23G 5/20 |
| | | | | 72/71 |
| 8,794,879 | B2 * | 8/2014 | Durst | B23G 5/18 |
| | | | | 407/119 |
| 2021/0016376 | A1 * | 1/2021 | Kopton | B23G 5/20 |

FOREIGN PATENT DOCUMENTS

| | | | |
|---|---|---|---|
| DE | 2852906 | A1 * | 6/1980 |
| DE | 19911308 | A1 | 9/2000 |
| DE | 102006010651 | A1 | 9/2007 |
| EP | 0026787 | A1 | 4/1981 |
| JP | 05253747 | A | 10/1993 |
| WO | 2019049078 | A1 | 3/2019 |

\* cited by examiner

HYBRID THREADING TOOL WITH CUTTING PORTION AND ROLLING PORTION

INTRODUCTION

The technical field generally relates to a threading tool and, more particularly, relates to a hybrid threading tool with a cutting portion and a rolling portion.

Some parts include threaded holes for threaded attachment to another component. For example, vehicle engine blocks often include a threaded hole for receiving, supporting, and threadably attaching to a bearing component. More specifically, the engine block may include a main bearing bolt hole that is threaded. Preferably, these and other types of threaded holes have high fatigue resistance, high load retention strength, and other advantageous performance characteristics.

However, conventional methods for threading holes are deficient in certain respects. The threading tools, machinery, systems, etc. that are currently available are similarly deficient. These limitations can be exacerbated in high-volume manufacturing processes. Accordingly, performance of the manufactured threaded hole and the respective threaded attachment is limited. Furthermore, manufacturing methods and systems of this type may be inefficient or may suffer from other problems.

Therefore, it is desirable to provide improved methods and systems for manufacturing parts with high-quality threaded holes. It is also desirable to provide improved methods and systems for manufacturing parts with threaded holes having high fatigue resistance and high load retention strength. Furthermore, it is desirable to provide manufacturing efficiencies in these systems and methods. Other desirable features and characteristics of the present disclosure will become apparent from the subsequent detailed description and the appended claims, taken in conjunction with the accompanying drawings and the foregoing technical field and background.

SUMMARY

A hybrid threading tool is provided for threading a hole of a workpiece. In one embodiment, the hybrid threading tool defines a longitudinal axis and includes a cutting portion with a plurality of cutting teeth. The plurality of cutting teeth is configured to cut a first threading into a workpiece. The hybrid threading tool also includes a forming portion that is attached to the cutting portion and arranged therewith along the longitudinal axis. The forming portion includes a plurality of forming teeth configured to plastically deform the first threading into a second threading for the workpiece.

In some embodiments, the cutting portion includes a first end and a second end that are spaced apart along the longitudinal axis. The forming portion includes a third end and a fourth end that are spaced apart along the longitudinal axis. The second end of the cutting portion is continuously connected to the third end of the forming portion.

In some embodiments, the cutting portion is tapered along the longitudinal axis.

In some embodiments, the cutting portion is entirely tapered at a single taper angle from the first end to the second end.

Furthermore, in some embodiments, the cutting portion has a first major diameter and the forming portion has a second major diameter. The first major diameter is, at most, between eighty percent (80%) and ninety-five percent (95%) of the second major diameter.

In some embodiments, the cutting portion and the forming portion are integrally connected and have common material characteristics.

In some embodiments, the cutting portion and the forming portion have different material characteristics.

In some embodiments, the cutting portion and the forming portion are made of different materials.

Additionally, in some embodiments, the cutting portion and the forming portion have different heat treatments that provide the different material characteristics.

Furthermore, in some embodiments, the cutting portion has higher hardness than the forming portion. Also, the forming portion has higher material toughness than the cutting portion.

In some embodiments, the plurality of cutting teeth is arranged in a first land and a second land. Also, the tool includes a chip opening defined circumferentially between the first land and the second land. The chip opening extends along the longitudinal axis through the cutting portion and is configured to receive chips from the cutting of the first threading. The chip opening extends along the longitudinal axis into the forming portion.

In some embodiments, the tool further includes a shank. The plurality of cutting teeth and the plurality of forming teeth are attached to the shank and extend outward radially therefrom and away from the longitudinal axis to define a hybrid male threading tap.

In some embodiments, the tool further includes a support body. The plurality of cutting teeth and the plurality of forming teeth are attached to the support body and extend inward radially therefrom and toward the longitudinal axis to define a female threading die.

Furthermore, a method is provided for manufacturing a hybrid threading tool for threading a workpiece. In one embodiment, the method includes making a plurality of cutting teeth to define a cutting portion of the hybrid threading tool. The method also includes making a plurality of forming teeth to define a forming portion of the hybrid threading tool. The forming portion is arranged with the cutting portion along the longitudinal axis. The plurality of cutting teeth is configured to cut a first threading into a workpiece, and the plurality of forming teeth is configured to plastically deform the first threading into a second threading for the workpiece.

In some embodiments, the method further includes attaching a first body to a second body to be arranged together along the longitudinal axis. The first body and the second body have different material characteristics. Also, making the plurality of cutting teeth includes making the plurality of cutting teeth on the first body and making the plurality of forming teeth on the second body.

In some embodiments, making the plurality of cutting teeth and making the plurality of forming teeth includes additively manufacturing at least one of the cutting portion and the forming portion.

Furthermore, in some embodiments, the method includes at least one of: heat treating at least one of the cutting portion and the forming portion to provide the one with a different material characteristic from the other; and coating at least one of the cutting portion and the forming portion to provide the one with a different material characteristic from the other.

Additionally, in some embodiments, making the plurality of cutting teeth and making the plurality of forming teeth includes making the plurality of cutting teeth and the plurality of forming teeth externally to form a hybrid male threading tap.

In some embodiments, making the plurality of cutting teeth and making the plurality of forming teeth includes making the plurality of cutting teeth and the plurality of forming teeth internally to form a hybrid female threading die.

Additionally, a hybrid threading tool for threading a main bearing bolt hole of an engine block is disclosed. The threading tool defines a longitudinal axis. In one embodiment, the hybrid threading tool includes a cutting portion with a plurality of cutting teeth. The cutting portion is tapered. The plurality of cutting teeth are configured to cut a first threading into the main bearing bolt hole at a first major diameter. Also, the hybrid threading tool includes a forming portion that is attached to the cutting portion and arranged therewith along the longitudinal axis. The forming portion includes a plurality of forming teeth configured to plastically deform the first threading into a second threading for the main bearing bolt hole. The second threading has a second major diameter. The first major diameter is, at most, ninety-five percent (95%) of the second major diameter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Generally, the present disclosure relates to manufacturing systems and methods for threading a hole in a workpiece, part, component, etc. The threaded hole provided using these systems and methods may provide high fatigue resistance, high load retention strength, and/or other improved characteristics.

In various embodiments, a hybrid threading tool is provided that includes both a thread-cutting portion and a thread-forming portion, which are attached and arranged along a longitudinal axis of rotation. The thread-cutting portion is configured for cutting a first threading of a hole. The thread-forming portion is configured for forming, rolling, and shaping the first threading and plastically deforming it into a second threading for the hole of the workpiece. Methods of making and using the hybrid tool are also disclosed according to various embodiments.

The hybrid tool may be a hybrid tap for internally threading a through-hole or a blind hole. The hybrid tool may be a hybrid die for externally threading a shaft or other component.

The hybrid tool may have a variety of configurations. The thread-cutting portion and thread-forming portion of the tool may have different shapes, diameters, and/or dimensions from each other. The thread-cutting portion and the thread-forming portions of the tools may also exhibit different material characteristics. For example, the different portions may be made from different materials, may have different heat treatments, different coatings, etc.

The hybrid tools and the associated methods of the present disclosure increase convenience and efficiency when forming threaded holes. The tools and the associated methods provide threaded holes having increased fatigue resistance, higher load retention strength, and other benefits.

The systems and methods of the present disclosure may be used for threading a wide variety of parts. In some embodiments, the tool may be used for manufacturing one or more threaded holes in a vehicle engine block. More specifically, the threaded hole may be provided in a main bearing bolt hole of an engine block. The manufacturing systems and methods may be useful for threading holes in a cast engine block (e.g., a cast aluminum alloy engine block), and the tools and methods of the present disclosure may be used in parts that are manufactured using advanced casting techniques. However, it will be appreciated that the threading tools, systems, and methods of the present disclosure may be employed for any suitable part without departing from the scope of the present disclosure.

Figure 1:
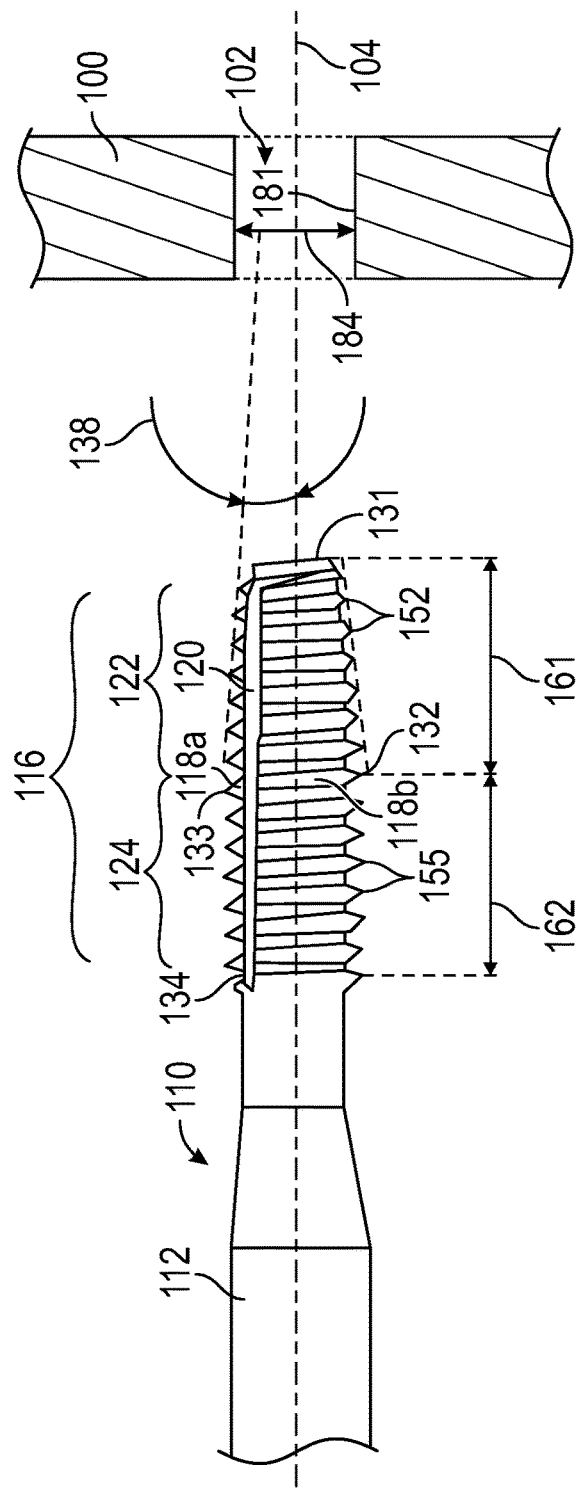
FIG. 1 is a side view of a hybrid threading tool shown in accordance with embodiments of the present disclosure.

Referring initially to FIG. 1, a workpiece 100 with a hole 102 is illustrated. The hole 102 may have a hole axis 104. The hole 102 may be a through-hole that extends through a full wall thickness of the workpiece 100 as illustrated, or the hole 102 may be a blind hole that is recessed through part of the thickness of the workpiece 100 in additional embodiments. The workpiece 100 may be a part of any suitable type. For example, the workpiece 100 may be an engine block in some embodiments. In some embodiments, the workpiece 100 may be a cast aluminum alloy engine block. The hole 102 may ultimately be used as a main bearing bolt hole for the engine block.

Also, a hybrid threading tool 110 is illustrated according to example embodiments of the present disclosure. As will be discussed, the hybrid threading tool 110 may be configured to cut threads and to subsequently form (plastically deform) threads. As shown in the illustrated embodiments, the tool 110 may be a male tap for manufacturing internal threading within the hole 102. However, as will be discussed with respect to FIGS. 4 and 5, the hybrid threading tool of the present disclosure may be configured as a female die for manufacturing external threading on a bolt or other workpiece.

As shown in FIG. 1, the hybrid threading tool 110 may include an elongate shank 112 that is cylindrical and centered on the axis 104. The shank 112 may have an external surface, at least part of which may be smooth. Portions of the shank 112 may be tapered in some embodiments as well. In some embodiments, a handle may be included on the shank 112 for grasping and manually turning the tool 110 about the axis 104. In other embodiments, the shank 112 may include a chuck for attachment to a machine for automatically rotating the shank 112 about the axis 104.

The tool 110 may also include a working end 116. In some embodiments, the working end 116 may include a plurality of threaded lands (e.g., a first land 118a and a second land 118b) that are separated in the circumferential direction by chip openings 120 (e.g., flutes). The chip openings 120 may be recessed slots that extend longitudinally along the working end 116. Although only two lands 118a, 118b and one chip opening 120 are illustrated, it will be appreciated that there may be more. For example, there may be at least three lands that are spaced apart equally about the axis 104 with respective chip openings defined between neighboring pairs of lands.

The working end 116 may be defined by a first portion and a second portion, which are arranged end-to-end along the axis. The first portion may be referred to as a cutting portion 122, and the second portion may be referred to as a forming portion 124 or as a rolling portion. The cutting portion 122 may have a first longitudinal length 161, and the forming portion 124 may have a second longitudinal length 162. The cutting portion 122 may be configured for cutting threading in the hole 102. The forming portion 124 may be configured for plastically deforming the threads cut by the cutting portion 122, which further threads the hole 102 and forms rolled threads.

The cutting portion 122 may include a first end 131 and a second end 132, and the forming portion 124 may include a third end 133 and a fourth end 134. The first end 131 may be disposed at and/or may define a terminal end of the hybrid tool 110. The second end 132 and the third end 133 may be connected together. The fourth end 134 may be disposed further along the axis 104 and spaced apart from the intersection of the second and third ends 132, 133.

Accordingly, the cutting portion 122 and the forming portion 124 may be coupled and attached to define a unitary, one-piece, hybrid tool 110 (e.g., a hybrid tap) that provides the benefits of both cutting and rolling threads. The tool 110 may be used in a single threading operation such that the cutting portion 122 initially cuts threads and the forming portion 124 further rolls and plastically deforms those threads. The threads may exhibit high fatigue resistance and high load retention strength. Thus, the threads manufactured using the tool 110 may retain a bolt and maintain the bolt load over a long operating lifetime.

The lands 118a, 118b and the chip openings 120 may extend along both the cutting portion 122 and the forming portion 124. As shown, the lands 118a, 118b and the chip opening 120 (as well as others that are hidden in FIG. 1) may extend continuously between the cutting and forming portions 122, 124 in the longitudinal direction. More specifically, a majority of the chip opening 120 may be axially straight and may extend uninterrupted along the axis 104 between the cutting and forming portions 122, 124. Also, within the cutting portion 122, the lands 118a, 118b may include a plurality cutting teeth 152 that project outwardly radially from the axis 104 and that extend along a helical path with respect to the axis 104. Within the forming portion 124, the lands 118a, 118b may include a plurality of forming teeth 155 that project outwardly radially from the axis 104 and that extend along a helical path with respect to the axis 104. The cutting teeth 152 and the forming teeth 155 may extend helically along the same spiral path about the axis 104. The teeth 152, 155 (including their respective peaks and troughs) may be arranged so that the cutting and plastic deformation may occur in sequence upon a single operation of the tool 110. In other words, the cutting teeth 152 at the second end 132 may be continuously connected to the forming teeth 155 at the third end 133. As such, during use, material cut by the cutting teeth 152 may be prepared for plastic deformation provided by the forming teeth 155. The cutting portion 122 may provide cut threads 180 in the workpiece 100 during use of the tool 110 (FIG. 2), and the forming portion may plastically deform and roll the threads 180 to provide formed threads 182 in the hole 102 (FIG. 3).

Referring back to FIG. 1, the cutting portion 122 may be tapered along the longitudinal axis 104. In some embodiments, the cutting portion 122 may be entirely tapered at a single taper angle 138 from the first end 131 to the second end 132 of the cutting portion 122. In contrast, the forming portion 124 may have a substantially constant diameter along its longitudinal length between the third end 133 and the fourth end 134. In some embodiments, the diameter of the cutting portion 122 may change gradually according to the taper angle 138, and the largest diameter of the cutting portion 122 may be defined by the cutting teeth 152 disposed at the second end 132. The taper angle 138 may range between ten and forty-five degrees (10°-45°) in various embodiments. Furthermore, the taper angle 138 may range between thirty and forty-five degrees (30°-45°).

The dimensions of the cutting portion 122 relative to those of the forming portion 124 may be predetermined and chosen to provide desired results. Generally, the forming teeth 155 may be larger in diameter than these cutting teeth 152. For example, the major diameter of the cutting teeth 152 may be, at most, ninety-five percent (95%) of the major diameter of the forming teeth 155. As such, the major diameter 140 of the cut thread 180 may be, at most, ninety-five percent (95%) of the major diameter 197 of the rolled thread 182. More specifically, in some embodiments, the major diameter of the cutting teeth 152 may be between eighty percent (80%) and ninety-five percent (95%) of the major diameter of the forming teeth 155. As such, the major diameter 140 of the cut thread 180 may be between eighty percent (80%) and ninety-five percent (95%) of the major diameter 197 of the rolled thread 182. Furthermore, in some embodiments, the major diameter of the cutting teeth 152 may be between ninety percent (90%) and ninety-five percent (95%) of the major diameter of the forming teeth 155. As such, the major diameter 140 of the cut thread 180 may be between ninety percent (90%) and ninety-five percent (95%) of the major diameter 197 of the rolled thread 182. Furthermore, the profile of the cutting teeth 152 may be configured for cutting and removing material from the workpiece 100 while the profile of the forming teeth 155 may be configured for plastically deforming and shaping threading on the workpiece 100.

In some embodiments, the cutting portion 122 and the forming portion 124 may have common material characteristics. For example, the cutting portion 122 may be made of the same material as the forming portion 124 (e.g., tool steel). Also, the portions 122 may have a common coating, heat treatment, material hardness, etc. In these embodiments, the tool 110 may be constructed by forming the cutting portion 122 and the forming portion 124 on a single, common shank 112, and the portions 122, 124 may be subjected to the same heat treatment, coatings, etc. As such, the cutting portion 122 and the forming portion 124 may be integrally connected and may have common material characteristics.

In alternative embodiments, the cutting portion 122 and the forming portion 124 may have different material characteristics. For example, in some embodiments, the cutting portion 122 may have higher material hardness than the forming portion 124 to enhance the cutting action of the cutting portion 122. The cutting portion 122 may have a hardness of at least RC50, and the forming portion 124 may have a lower hardness in some embodiments. Also, in some embodiments, the forming portion 124 may have higher material toughness than the cutting portion 122 to enhance the thread-rolling performance of the forming portion 124. To provide the portions 122, 124 with different material characteristics, the portions 122, 124 may be formed separately from different materials and then fixedly attached (e.g., by welding). In further embodiments, the tool 110 may be formed using additive manufacturing techniques, and these techniques may be utilized for forming the tool 110 with the portions 122, 124 attached and with different material characteristics. In further embodiments, one of the portions 122, 124 may be subjected to a different heat treatment from the other to provide the different material characteristics (e.g., one may receive a first heat treatment and the other may receive a different second heat treatment or one may be heat treated but not the other). In additional embodiments, one of the portions 122, 124 may be coated different from the other to provide the different material characteristics (e.g., one may have a first coating and the other may have a different second coating, or one may be coated but not the other). Coatings for the portions 122, 124 may be chosen from a group consisting of titanium nitride (TiN), titanium carbonitride or carbo-nitride (TiCN), chrome plate, nitride, aluminum chromium nitride (AlCrN), and aluminum chromium titanium nitride (AlCrTiN) in some embodiments. TiN, for example, may be chosen for increasing chip flow when threading softer materials. TiCn may be chosen for its high hardness and wear resistance. Also, chrome plate may be chosen for its anti-friction properties. Nitride may be chosen for its high hardness. AlCrN may be chosen for its thermal properties. AlCrTiN may be chosen for its thermal and/or wear resistance characteristics. Also, TiCN and/or TiN may be chosen for its thermal properties and high hardness properties.

Figure 2:
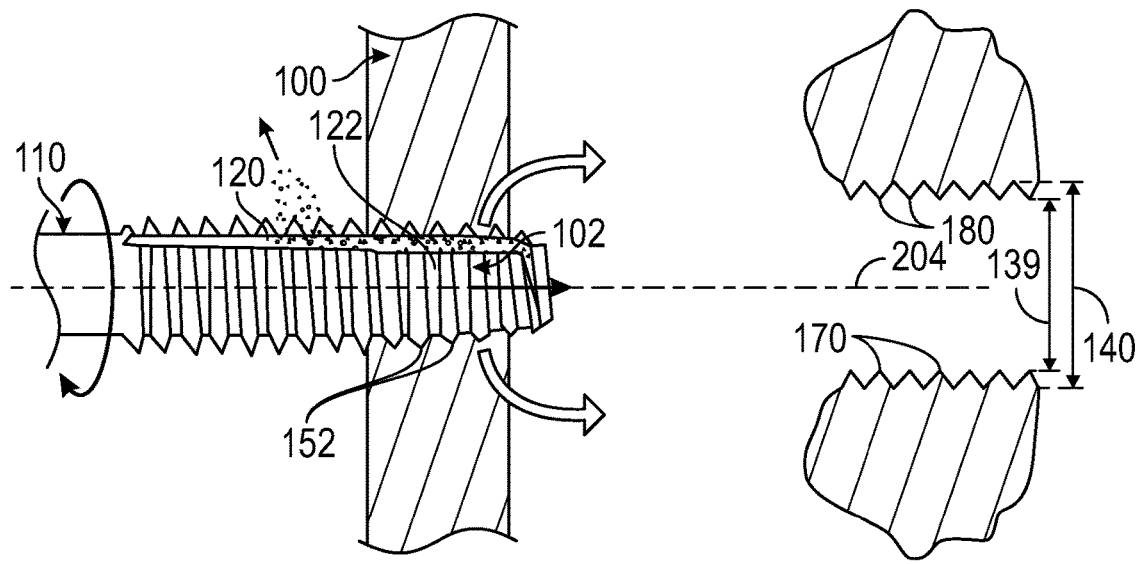
FIG. 2 is a side view of the hybrid threading tool of FIG. 1 shown cutting threads in a workpiece according to example embodiments of the present disclosure.
Figure 3:
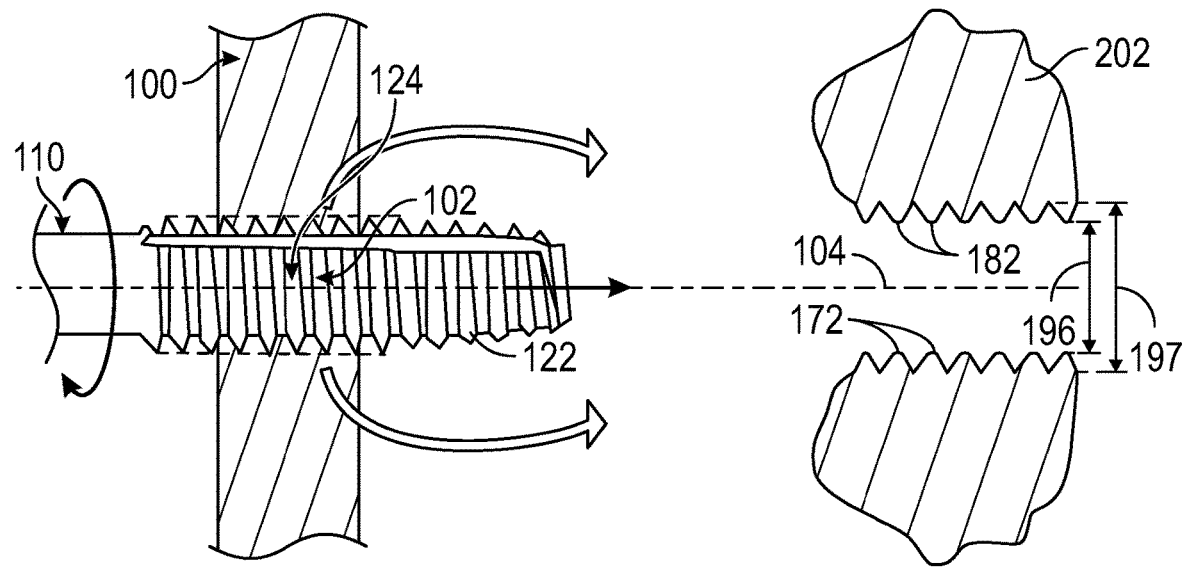
FIG. 3 is a side view of the hybrid threading tool of FIG. 1 shown rolling and forming threads in the workpiece according to example embodiments of the present disclosure.

Referring now to FIGS. 1-3, methods of threading the hole 102 using the hybrid threading tool 110 will be discussed according to example embodiments. As shown in FIG. 1, the workpiece 100 may be provided with the hole 102 at a first diameter 184 (FIG. 1) The hole 102 may be provided with a smooth, annular inner diameter surface 181. In some embodiments, the first diameter 184 may be chosen to be approximately equal to a minor diameter 196 of the resulting rolled threads 182. As such, the amount of cutting performed by the cutting portion 122 may be relatively low for increasing manufacturing efficiency.

As mentioned above, the hole 102 may be a through-hole or a blind hole. There may be an array of hybrid threading tools 110 having different sizes and/or other characteristics, and the tool 110 may be chosen from the array according to the diameter 184, according to the material characteristics of the workpiece 100, and/or according to other factors. For example, the tool 110 with a greater taper angle 138 may be provided for a workpiece 100 that has higher ductility. In contrast, the tool 110 with a lower taper angle 138 may be provided for a workpiece 100 that has higher hardness. Likewise, if the hole 102 is a blind hole, then the tool 110 with a cutting portion 122 having a smaller length 161 may be chosen. Likewise, the tool 110 with a higher taper angle 138 may be chosen in cases in which the hole 102 is a blind hole, whereas the tool 110 with a lower taper angle 138 may be chosen in cases in which the hole 102 is a through-hole.

Then, as shown in FIG. 2, the tool 110 may be rotated about the axis 104, and the cutting portion 122 of the tool 110 may be advanced into the hole 102. Accordingly, the cutting teeth 152 may remove material to form the cut threads 180. Chips may be received within the openings 120 and may move longitudinally along the tool 110 for removal from the workpiece 100. The cut threads 180 may be cut to dimensions that inversely correspond to those of the cutting teeth 152. Thus, the cut threads 180 may be cut to a minor diameter 139 and at a major diameter 140 that gradually taper according to the taper angle 138. As represented, crown tips 170 of the cut threads 180 may be relatively sharp and pointed.

Next, as shown in FIG. 3, the tool 110 may continue to rotate and may be further advanced along the axis 104 such that the forming portion 124 is provided in the hole 102. As the forming portion 124 advances into the hole 102, the forming teeth 155 of the forming portion 124 may plastically deform the threads 180 to form rolled threads 182. For example, the forming teeth 155 may plastically deform the crown tips 170 of the cut threads 180 to form the rolled threads 182. The forming teeth 155 may also plastically deform the thread roots between the tips 170 during this rolling action. These threads 182 may be cut at a minor diameter 196 and at a major diameter 197. The minor diameter 196 may be approximately equal to the original diameter 184 of the hole 102 (FIG. 1). As represented in FIG. 3, the crown tips 172 of the rolled threads 182 may be saw-toothed, but may have a more rounded profile than the crown tips 170 of the cut threads 180.

Accordingly, the cutting portion 122 may efficiently cut the threads 180, and the forming portion 124 may subsequently roll the threads 182. The cutting action of the cutting portion 122 may improve load retention strength, and the rolling action of the forming portion 124 may improve fatigue resistance for the resulting threads 182. The plastic deformation provided by the forming portion 124 may reduce porosity in the region without introducing a high degree of microcracking due to the fact that the majority of the thread was previously provided by the cutting portion 122. The plastic deformation at the thread roots may reduce porosity and compressive residual stress to improve fatigue performance. The thread body may have minimal micro-damage to maintain creep resistance and load retention strength. Advantageously, the resultant rolled threads 182 may exhibit high fatigue resistance, high load retention, etc.

Figure 4:
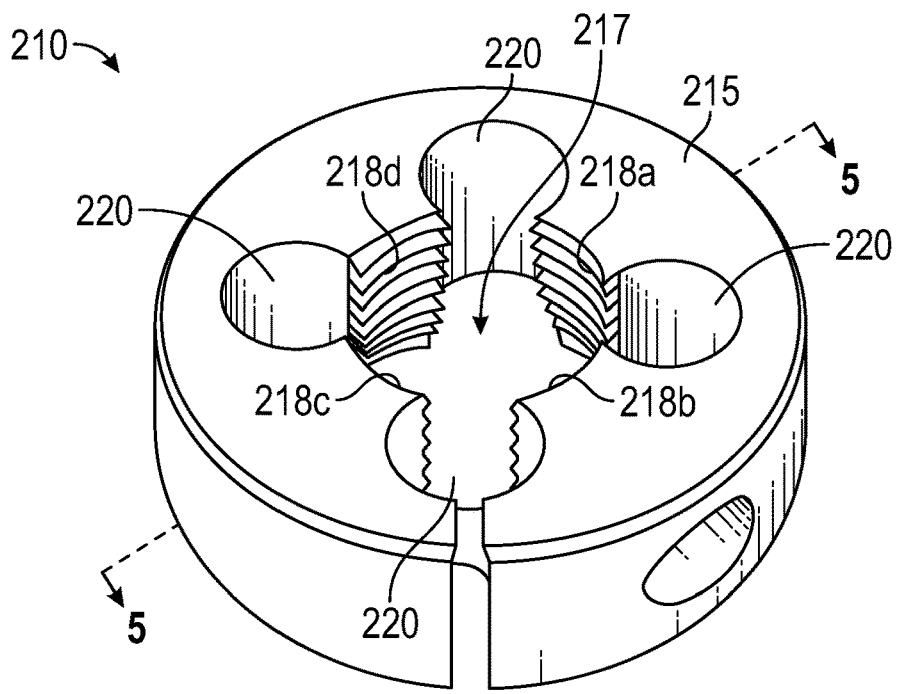
FIG. 4 is a perspective view of the hybrid threading tool shown in accordance with additional embodiments of the present disclosure.
Figure 5:
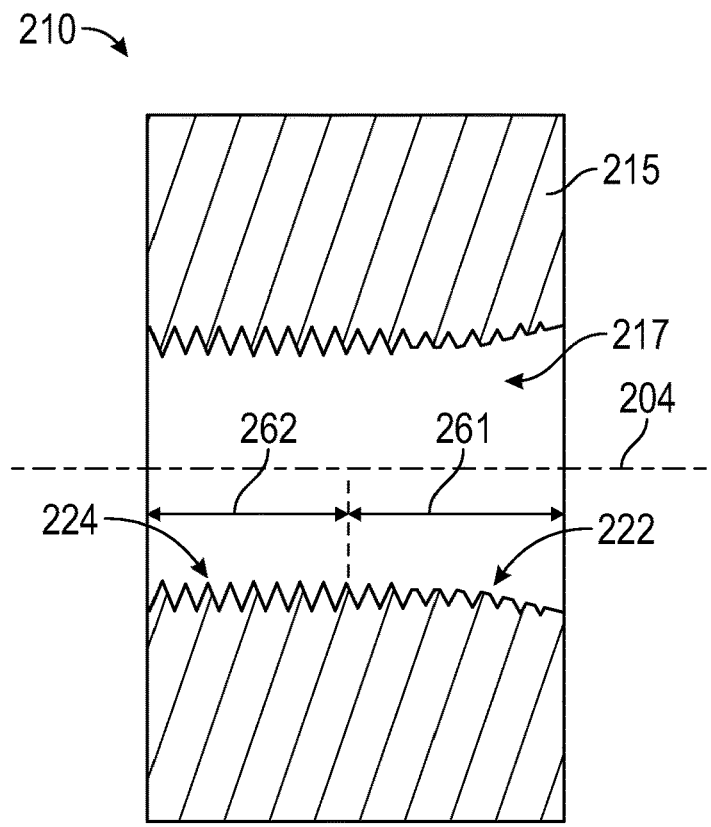
FIG. 5 is a sectional view of the hybrid threading tool taken along the line 5-5 of FIG. 4.

Referring now to FIGS. 4 and 5, additional embodiments of the hybrid threading tool 210 are illustrated according to example embodiments of the present disclosure. The tool 210 may share features with the tool 110 discussed above and illustrated in FIGS. 1-3. Thus, description of those features will not be repeated. Components that correspond to those of FIGS. 1-3 will be indicated with corresponding reference numbers increased by 100.

As shown, the hybrid threading tool 210 may be configured as a female threading die for manufacturing external threading onto a shaft (e.g., to thread a bolt, etc.). The tool 210 may include a generally annular support body 215. The support body 215 may include a central aperture 217 that is internally threaded so as to define the cutting portion 222 along the first length 261 and the forming portion 224 along the second length 262. As shown, the cutting portion 222 may be tapered in diametral width along the first length 261, and the forming portion 224 may have a constant diameter, similar to the embodiments discussed above. The tool 210 may also include a plurality of chip openings 220 between respective lands 218a, 218b, 281c, 218d.

Like the embodiments discussed above, the tool 210 may be used to initially cut and then subsequently form threading. Specifically, a workpiece (e.g., a shaft, shank, rod, etc.) may be received in the cutting portion 222, and the tool 210 may be rotated about the axis 204. By rotating the tool 210 and advancing the tool 210 along the workpiece, the cutting portion 222 may initially cut threading, and the forming portion 224 may plastically deform and shape the cut threading into rolled threading.

Methods of manufacturing the hybrid threading tool 110, 210 will now be discussed according to example embodiments. These methods will be discussed specifically with reference to the tool 110 (the male tap) of FIGS. 1-3. However, it will be appreciated that these methods may be utilized to manufacture the tool 210 (the female die) of FIGS. 4 and 5.

In some embodiments, the shank 112 may be unitary and provided with a smooth outer surface. The shank 112 may then be machined (i.e., material removed) to form the cutting teeth 152, the forming teeth 155, the chip openings 120, and/or other features of the tool 110. Then, in some embodiments, the tool 110 may be polished, heat treated, coated, and/or otherwise processed. In some embodiments, these methods may cause the cutting portion 122 and the forming portion 124 to have common material characteristics.

Figure 6:
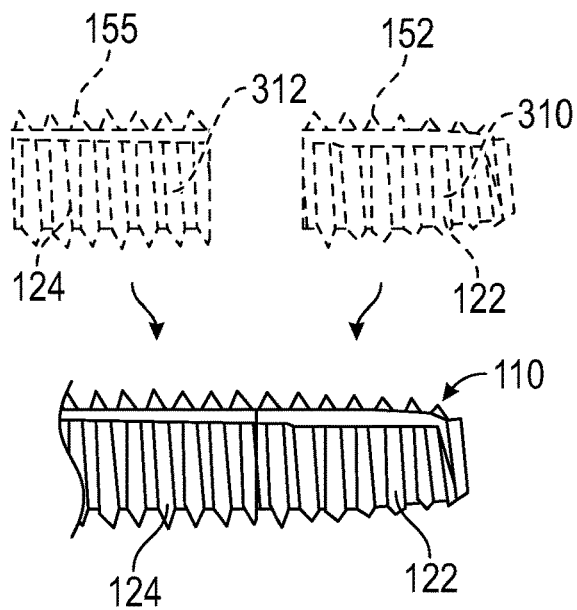
FIG. 6 is a schematic illustration of methods of manufacturing the hybrid threading tool of FIG. 1 according to example embodiments of the present disclosure.

In additional embodiments represented in FIG. 6, the cutting portion 122 and the forming portion 124 may be formed separately (shown in phantom). The cutting teeth 152 of the cutting portion 122 may be formed on one body 310, and the forming teeth 155 of the forming portion 124 may be formed on another body 312. Then, the cutting portion 122 and the forming portion 124 may be joined end-to-end. In some embodiments, the cutting portion 122 and the forming portion 124 may be fixedly attached via welding. Furthermore, in some embodiments, the cutting portion 122 may be formed from one material, and the forming portion 124 may be formed from another material. For example, the cutting portion 122 may be formed from a material that has a higher material hardness than that of the forming portion 124. Also, in some embodiments, the forming portion 124 may be formed from a material that has a higher material toughness than that of the cutting portion 122.

Figure 7:
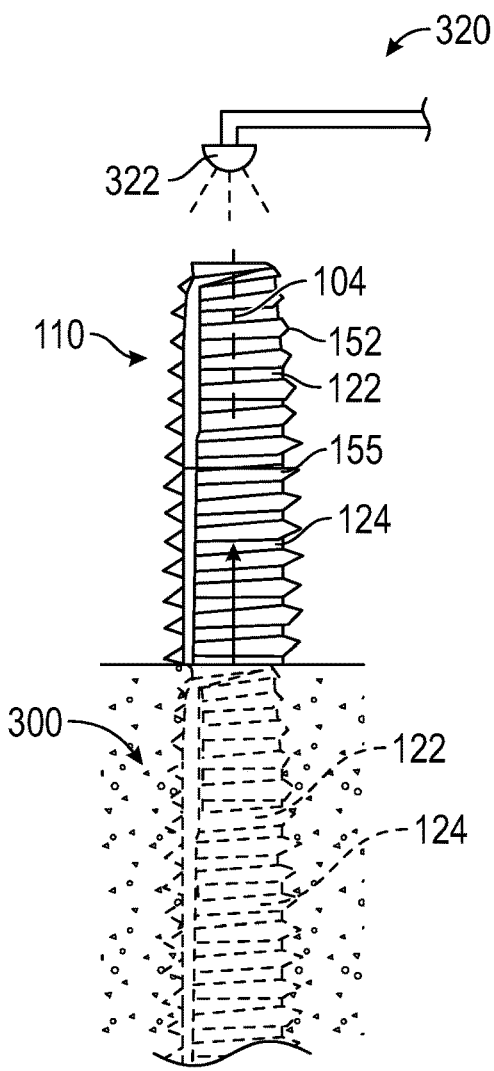
FIG. 7 is a schematic illustration of methods of manufacturing the hybrid threading tool of FIG. 1 according to additional embodiments of the present disclosure.

In further embodiments illustrated in FIG. 7, the tool 110 may be additively manufactured. For example, an additive manufacturing device 320 may be used. An emitter 322 may emit energy toward a bed 300 of powder material to form the tool 110 layer-by-layer. The tool 110 (including the cutting teeth 152 and forming teeth 155) may be constructed additively and may grow progressively. In the illustrated embodiment, the tool 110 may be formed progressively along the axis 104; however, in other embodiments, the tool 110 may be formed progressively in another direction (e.g., perpendicular to the axis 104). This process may be convenient and highly efficient. Also, this additive manufacturing process may provide the cutting and forming portions 122, 124 with common material characteristics. In other embodiments, the additive manufacturing process may provide the cutting and forming portions 122, 124 with different material characteristics. In further embodiments, the additive manufacturing process may be used to form the cutting and forming portions 122, 124 separately, and once formed, the portions 122, 124 may be attached end-to-end (e.g., by welding).

Figure 8:
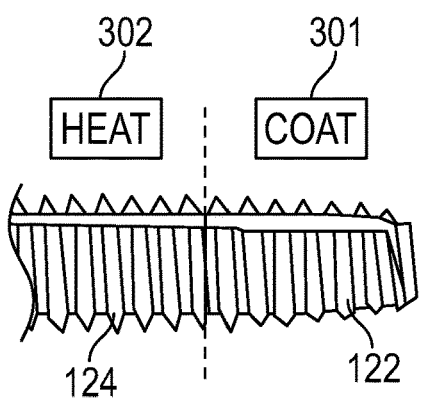
FIG. 8 is a schematic illustration of methods of manufacturing the hybrid threading tool of FIG. 1 according to additional embodiments of the present disclosure.

Moreover, in embodiments illustrated in FIG. 8, manufacture of the tool 110 may include use of a heat treatment device 302. In some embodiments, the heat treatment device 302 may be used to provide at least one heat treatment to the tool 110. In some embodiments, the cutting portion 122 and the forming portion 124 may both be heat treated in the same manner to have common material characteristics. In other embodiments, the cutting and forming portions 122, 124 may be heat treated differently to provide different material characteristics. Also, in some embodiments, one of the cutting and forming portions 122, 124 may be heat treated instead of the other to provide different material characteristics. Furthermore, to provide different material characteristics, the heat treatment device 302 may be used to heat treat at least one portion 122, 124 while separated, and then the portions 122, 124 may be subsequently attached end-to-end (e.g., by welding).

Likewise, as shown in FIG. 8, manufacture of the tool 110 may include use of a coating device 301. In some embodiments, the coating device 301 may be used to provide at least one coating to the tool 110. In some embodiments, the cutting portion 122 and the forming portion 124 may be coated with a common coating. In other embodiments, the cutting and forming portions 122, 124 may be provided with different coatings to provide different material characteristics thereto. Also, in some embodiments, one of the cutting and forming portions 122, 124 may be coated instead of the other to provide different material characteristics thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A hybrid threading tool that defines a longitudinal axis comprising:
   a cutting portion with a first end and a second end spaced apart along the longitudinal axis, the cutting portion including a plurality of cutting teeth, the plurality of cutting teeth configured to cut a first threading into a workpiece;
   a forming portion with a third end and a fourth end spaced apart along the longitudinal axis, the third end being attached to the second end of the cutting portion at a junction, the forming portion arranged with the cutting portion along the longitudinal axis, the forming portion including a plurality of forming teeth configured to plastically deform the first threading into a second threading for the workpiece; and
   wherein the cutting portion and the forming portion have different material characteristics that are different at the junction.

2. The hybrid threading tool of claim 1,
wherein the plurality of cutting teeth at the second end of the cutting portion is continuously connected to the plurality of forming teeth at the third end of the forming portion.

3. The hybrid threading tool of claim 2, wherein the cutting portion is tapered along the longitudinal axis.

4. The hybrid threading tool of claim 3, wherein the cutting portion is entirely tapered at a single taper angle from the first end to the second end.

5. The hybrid threading tool of claim 1, wherein the cutting portion has a first major diameter and the forming portion has a second major diameter; and
wherein the first major diameter is, at most, between eighty percent (80%) and ninety-five percent (95%) of the second major diameter.

6. The hybrid threading tool of claim 1, wherein the cutting portion and the forming portion are integrally connected.

7. The hybrid threading tool of claim 1, wherein the cutting portion and the forming portion are made of different materials.

8. The hybrid threading tool of claim 1, wherein the cutting portion and the forming portion have different heat treatments that provide the different material characteristics.

9. The hybrid threading tool of claim 1, wherein the cutting portion has higher hardness than the forming portion, and wherein the forming portion has higher material toughness than the cutting portion.

10. The hybrid threading tool of claim 1, wherein the plurality of cutting teeth is arranged in a first land and a second land, and further comprising a chip opening defined circumferentially between the first land and the second land, the chip opening extending along the longitudinal axis through the cutting portion and configured to receive chips from the cutting of the first threading, the chip opening extending along the longitudinal axis into the forming portion.

11. The hybrid threading tool of claim 1, further comprising a shank; and
wherein the plurality of cutting teeth and the plurality of forming teeth are attached to the shank and extend outward radially therefrom and away from the longitudinal axis to define a hybrid male threading tap.

12. The hybrid threading tool of claim 1, further comprising a support body; and
wherein the plurality of cutting teeth and the plurality of forming teeth are attached to the support body and extend inward radially therefrom and toward the longitudinal axis to define a female threading die.

13. A hybrid threading tool for threading a main bearing bolt hole of an engine block, the threading tool defining a longitudinal axis and comprising:

a cutting portion with a first end and a second end spaced apart along the longitudinal axis, the cutting portion including a plurality of cutting teeth, the cutting portion being tapered, the plurality of cutting teeth configured to cut a first threading into the main bearing bolt hole at a first major diameter;

a forming portion with a third end and a fourth end spaced apart along the longitudinal axis, the third end being attached to the second end of the cutting portion at a junction, the forming portion arranged with the cutting portion along the longitudinal axis, the forming portion including a plurality of forming teeth configured to plastically deform the first threading into a second threading for the main bearing bolt hole, the second threading having a second major diameter, the first major diameter being, at most, ninety-five percent (95%) of the second major diameter; and wherein the cutting portion and the forming portion have different material characteristics that are different at the junction, the cutting portion having higher hardness than the forming portion and the forming portion having higher material toughness than the cutting portion.

14. The hybrid threading tool of claim 13, wherein the cutting portion is tapered along the longitudinal axis.

15. The hybrid threading tool of claim 14, wherein the cutting portion is entirely tapered at a single taper angle from the first end to the second end.

16. The hybrid threading tool of claim 13, wherein the cutting portion and the forming portion are integrally connected.

17. The hybrid threading tool of claim 13, wherein the cutting portion and the forming portion have different heat treatments that provide the different material characteristics.

18. The hybrid threading tool of claim 13, wherein the plurality of cutting teeth is arranged in a first land and a second land, and further comprising a chip opening defined circumferentially between the first land and the second land, the chip opening extending along the longitudinal axis through the cutting portion and configured to receive chips from the cutting of the first threading, the chip opening extending along the longitudinal axis into the forming portion.

19. The hybrid threading tool of claim 13, further comprising a shank; and
wherein the plurality of cutting teeth and the plurality of forming teeth are attached to the shank and extend outward radially therefrom and away from the longitudinal axis to define a hybrid male threading tap.

20. The hybrid threading tool of claim 13, wherein the third end is attached to the second end at a weldment.

* * * * *